United States Patent [19]
Pargeter et al.

[11] Patent Number: 5,993,512
[45] Date of Patent: Nov. 30, 1999

[54] METHOD AND SYSTEM FOR RECYCLING BYPRODUCT STREAMS FROM METAL PROCESSING OPERATIONS

[75] Inventors: John K. Pargeter, Vorhees, N.J.; Mark S. Mazanek, Rosemont; Dale A. Zuck, E. Norriton, both of Pa.

[73] Assignee: AllMetTechnologies, Inc., Trevose, Pa.

[21] Appl. No.: 08/987,577

[22] Filed: Dec. 9, 1997

[51] Int. Cl.$^6$ ....................................................... C22B 5/20
[52] U.S. Cl. ................................................. 75/416; 75/419
[58] Field of Search ............................ 75/419, 672, 416; 266/137; 65/19; 423/131

[56] References Cited

U.S. PATENT DOCUMENTS

| | | | |
|---|---|---|---|
| 3,043,678 | 7/1962 | Lowry et al. | 65/19 |
| 3,615,329 | 10/1971 | Jones et al. | 65/19 |
| 3,770,424 | 11/1973 | Floyd et al. | 75/416 |
| 5,013,356 | 5/1991 | Olper et al. | 75/586 |
| 5,041,398 | 8/1991 | Kauser et al. | 501/27 |
| 5,102,453 | 4/1992 | Yerushalmi | 75/416 |
| 5,198,200 | 3/1993 | Yerushalmi et al. | 423/131 |
| 5,290,535 | 3/1994 | Zuck et al. | 423/627 |
| 5,330,618 | 7/1994 | Daniels et al. | 159/47.1 |
| 5,435,835 | 7/1995 | Lynn et al. | 75/770 |

*Primary Examiner*—Prince Willis
*Assistant Examiner*—Tima McGuthry-Banks
*Attorney, Agent, or Firm*—Buchanan Ingersoll, P.C.

[57] ABSTRACT

A method and system for recycling byproduct streams from metal processing operations introduces a flow of a molten mixture of salts, metal and metal oxides from a melting vessel into a flow of water. The molten salts dissolve into the water. The metal oxides, and any metal entrapped in the molten mixture, instantly fragment into small particles. The slurry of brine and small particles flows into a storage tank and from there the brine can be separated from the small particles by employing a series of known liquid-solid separation techniques which preferably utilize cyclones, centrifuges, thickeners, and filters. In the case of aluminum processes, an antioxidant is preferably provided in the holding tank. To increase the settling rate of the solids, a flocculent can be added in the thickener. Salt can be recovered by spraying the brine onto the exterior surface of a rotating drum which is heated to high temperatures such that the water in the brine instantly evaporates and deposits a thin layer of salt on the drum which can be scraped off and prepared for sale. The drum is preferably heated by offgas from existing high temperature metal processing operations. The metal particles can be separated from the metal oxides using known techniques. The separated metals can be charged back into the melting vessel for final recovery. The metal oxides can be either sold or re-used in metal processing operations. Thus, all byproducts are completely recycled and no wastes are landfilled.

20 Claims, 3 Drawing Sheets

METHOD AND SYSTEM FOR RECYCLING BYPRODUCT STREAMS FROM METAL PROCESSING OPERATIONS

FIELD OF THE INVENTION

This invention relates generally to a method and system for efficiently and economically recycling salt/metal oxide containing residual streams from metal processing operations, and, more particularly, to a method for recovering salt, metals, and metal oxides from byproduct streams typically generated by secondary zinc and aluminum dross processing operations.

BACKGROUND OF THE INVENTION

Byproduct streams commonly produced by secondary zinc operations (particularly those associated with recovering zinc from steel mill residuals and byproducts), secondary aluminum operations and aluminum dross processing operations typically have an appreciable salt content. This salt content can be problematic for the further processing and recovery of these materials. Traditionally, the majority of these high salt content materials have ended up in either solid or hazardous waste landfills. In recent years, it should be noted, more of these materials have been recycled, yet the salt fraction still has ended up in landfills or been deep well injected.

In the steel industry, two predominant streams that contain salt are electric arc furnace dust ("EAF Dust") and basic oxygen furnace dust ("BOF" dust). The U.S. Environmental Protection Agency has considered EAF Dust a hazardous waste when landfilled due to its potential to leach any of the four following toxic elements; cadmium, lead, nickel, and hexavalent chromium. BOF Dust is not considered a hazardous waste when landfilled as it typically contains only trace amounts of the previously listed toxic elements. The average EAF Dust has a total salt content of approximately 6%, and the average BOF Dust has a total salt content of approximately 2%.

The salt in these residual streams primarily originates as a coating on automobiles from roadways in the northern climates and/or the coastal areas where salt is picked up from the air. Salt is vaporized from shredded automobile scrap when charged to high temperature furnaces and ends up as a dust particulate captured by the offgas system. These salts combine with all the other particulate generated by the furnace operation and becomes EAF or BOF Dust.

Various processes have been devised to process EAF and BOF Dusts for the recovery of metals contained in the dusts as an alternative to landfilling. As a result of these processes, the salts are concentrated into a residual material stream that is sent to hazardous waste landfills.

Secondary aluminum processing operations and dross recovery plants use a mixture of potassium chloride and sodium chloride salts as a melting flux during furnace operations to maximize the recovery of aluminum metal. Aluminum has a high affinity for combining with oxygen. Furnace operators have found that a layer of molten salts upon the molten aluminum helps minimize the formation of aluminum oxide compounds, which minimizes the corresponding loss in metal yields during melting operations.

In secondary aluminum processing operations, molten salts combine with any aluminum oxides formed during the furnace operations forming aluminum dross. The aluminum dross is typically raked from the furnace into large pans which allows the aluminum dross to cool into large chunks or shapes. It is not uncommon for a small percentage of aluminum metal to become entrapped in the aluminum dross. Aluminum dross typically contains sufficient amounts of aluminum metal to economically support metal recovery activities. In fact, an entire industry has prospered through processing aluminum dross for the recovering of aluminum metal. However, aluminum dross processing operations also produce a byproduct, similar to dross, which is commonly referred to as "saltcake." This saltcake typically contains insufficient metal value to support recycling using conventional techniques. Although a small number of saltcake processors have prospered through competition with regionally expensive landfills and profitable sale of products recovered therefrom, saltcake is commonly disposed of in solid waste landfills.

The wet processing of zinc dross, aluminum dross and saltcake results in the production of brine. Most brine typically contains a number of different salts. Sodium chloride, potassium chloride, and magnesium chloride are the most common salts found in brine. Commercial salt-production-from-brine processes utilize the basic principle of exceeding the saturation level for each salt in the brine through evaporation of the water thereby causing the salts to selectively precipitate out of solution. The most common commercial technique for selective recovery of individual salts involves the use of a series of solar evaporation ponds. As salts in solution have different saturation limits, through the controlled movement of brine through a series of ponds during evaporation, the various salts can be forced to precipitate in separate ponds for subsequent recovery as individual products. It is not uncommon for mixtures of salts to be pre-precipitated in staging ponds as the brine pond manager strives to produce high purity products from this extremely large, and often unwieldy process. One common mixture of pre-precipitated salts is sodium chloride and potassium chloride that can be further processed to be ideally suited for use as a melting flux by the aluminum industry. Aluminum furnace operators have found that a mixture of sodium chloride and potassium chloride melts at a lower temperature than either salt alone, thus reducing energy costs.

A number of difficulties can arise when using conventional wet processing techniques to recover brine, metal, and metal oxides from, for example, aluminum dross or saltcake. Typically, blocks of aluminum dross or saltcake must be crushed into small pieces prior to subsequent processing. This can require equipment which is extremely capital intensive. Additionally, when water is used to leach the salts from the crushed mixture, the fine metallics react with the water resulting in a reduction of the metal recovery yield as well as the formation of hydrogen and ammonia gases. This evolution of gases makes it very difficult to separate the fine metallics and the aluminum-oxides from the brine in subsequent liquid-solid separation processes. For a detailed review of known wet processing techniques, reference is made to U.S. Pat. Nos. 5,013,356 to Olper et al., 5,290,535 to Zuck et al., and 5,330,618 to Daniels et al.

Accordingly, there is a need for an efficient and economical recycling method which can be operated at the site of the residual's generation that results in 100% recovery of residual byproducts to "close the loop" on various metallurgical processes. Such a method should maximize high value metal recovery and utilize waste heat from primary metallurgical operations for optimum cost efficiency.

SUMMARY OF THE INVENTION

The invention provides a method and system for economically and efficiently recovering metals, metal oxides, and salt from byproduct streams produced by, for example, secondary zinc and aluminum dross processing operations. The method results in the complete recovery of metals, metal oxides, and salts from the byproduct streams, thereby avoiding the need to landfill any residual materials.

In both a zinc splash condenser and an aluminum dross processing furnace, a molten salt/oxide composition forms and floats on the surface of the molten metal. It is also not uncommon for a small percentage of metal to become entrapped in the molten mixture. The zinc splash condenser and the aluminum dross processing furnace both operate at temperatures in excess of 625° C. At these extreme temperatures, the molten salt/oxide mixture is fluid and flows easily.

In accordance with the invention, the molten salt/oxide mixture is periodically tapped from the zinc splash condenser or aluminum dross processing furnace and introduced into a water granulation process. The molten salt/oxide mixture instantaneously fragments upon contact with water. The salts quickly dissolve into the water, forming brine. The insoluble metal oxides and any trapped metal immediately fragment into small diameter particles. The resulting brine solution and insoluble metal and metal oxide particles form a slurry which is directed into a holding tank. In the aluminum metal recovery process, it is generally necessary that a passivating agent (antioxidant) be contained in the holding tank to immediately coat the fine aluminum particles, making them hydrophobic, thereby stopping the oxidation reaction. In the zinc recovery process, a passivating agent is not required since zinc metal will not oxidize in the presence of water.

The slurry then flows from the holding tank into a liquid/solid separator where a series of cyclones, centrifuges, thickeners and filters carryout an effective first liquid-solid separation. Additionally, a flocculent can be added in the thickener to increase the settling rate of the solids. The pH of the slurry is continually monitored and adjusted to ensure the removal of any dissolved metals from the dissolved salt solution as a solid. The brine solution is then passed through a sand filter to ensure a thorough removal of any remaining solids and finally transferred to a holding tank.

Next, the brine is pumped from the holding tank to an evaporator. The evaporator can be a rotating cylindrical drum forming part of the offgas ductwork from an adjacent high temperature material processing furnace operation. The brine is sprayed onto the exterior surface of the highly heated drum. As the brine solution contacts the drum the water contained therein instantaneously evaporates, leaving a thin layer of salt deposited on the exterior surface of the drum. As the drum rotates, a salt layer builds up on the exterior surface of the drum which is periodically removed and conveyed from the area for further processing or to a bulk storage or packaging area.

The metal and metal oxide solids recovered from the liquid-solid separation process are transferred to a metal/oxide separator where any number of well known techniques can be employed to separate the metal particles from the metal oxides. The separated zinc and aluminum metal can be returned to the zinc splash condenser or the aluminum dross processing furnace for final recovery. The aluminum oxides can be further processed using well known methods to remove the chlorides and produce a salable product. The zinc oxides can be reintroduced into the furnace operation and further reduced to a metal vapor for reintroduction into the zinc splash condenser.

Consequently, all residual byproducts can be economically and efficiently processed whereby no waste materials require landfilling.

Other details, objects, and advantages of the invention will become apparent from the following detailed description and the accompanying drawings figures of certain presently preferred embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF THE PREFERRED EMBODIMENTS

Figure 1:
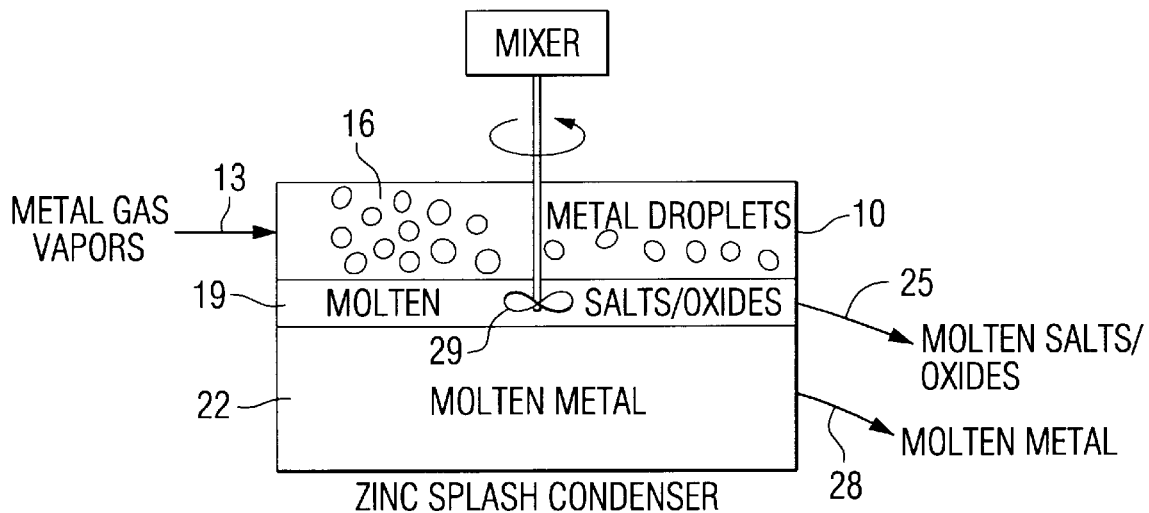
FIG. 1 is a schematic flow chart illustrating a prior art zinc splash condenser.
Figure 2:
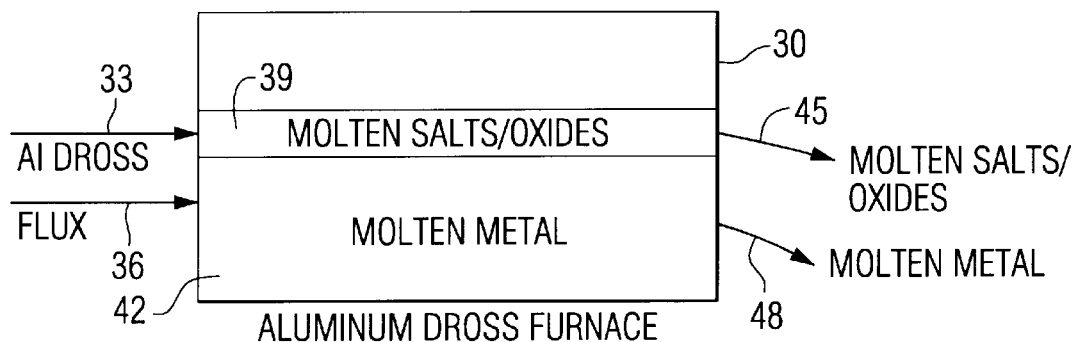
FIG. 2 is a schematic flow chart illustrating a prior art aluminum dross processing furnace.

To aid in understanding the present preferred embodiments it will be helpful to first describe two prior art metal production process, as shown in FIGS. 1 and 2.

FIG. 1 illustrates how a molten mixture of molten salt and oxides is generated by a zinc splash condenser. The splash condenser contains molten zinc and lead, and can also include trace amounts of various other metals. Agitators spinning at the surface of the molten metal cause a storm of metal droplets to form within the splash condenser. Metal gas vapors are introduced into the condenser and encounter the myriad of relatively cool metal droplets. The metal vapors condense on the droplets causing them to fall down into the growing volume of molten metal within the splash condenser. The molten metal is periodically tapped from the splash condenser and cast into common shapes for commercial sale.

When steel industry generated materials are processed in the zinc splash condenser the metal gas vapors introduced into the condenser can also contain sodium and potassium chlorides. These chloride vapors also condense upon the metal droplets, fall to the surface of the molten metal and combine with any metal oxides floating on the molten metal. The molten mixture of metal oxides and salts forms a floating layer, commonly referred to as zinc dross, on top of the molten metal. The zinc dross is periodically tapped from the zinc splash condenser and has historically been discarded into landfills. The zinc dross is typically 40% to 60% zinc oxide and 40% to 60% salts. It is also not uncommon for a small percentage of zinc metal to become entrapped in the zinc dross. The salts typically contain 30% to 40% potassium chloride and 60% to 70% sodium chloride.

FIG. 2 illustrates how a molten mixture of salt and metal oxides is generated in an aluminum dross processing furnace. The furnace is charged with aluminum dross and salt flux for the purpose of recovering aluminum metal contained within the aluminum dross. The salt flux melts, forming a viscous liquid on the surface of the molten aluminum. This molten mixture protects the highly reactive molten aluminum from contact with oxygen. The molten mixture also entraps aluminum oxide particles generated during the aluminum melting and dross processing operations.

The salt flux used in aluminum dross recovery operations is typically 30% to 40% potassium chloride and 60% to 70% sodium chloride. The molten aluminum metal is tapped from the furnace leaving behind the remaining metal oxide and spent salt mixture, commonly referred to as "saltcake." The saltcake is then raked from the furnace into large tubs for cooling. Once cooled and solidified, the large chunks of saltcake have historically been landfilled. The composition of aluminum saltcake is typically 50% to 70% aluminum oxide and 30% to 50% salt flux. It is also not uncommon for a very small percentage of aluminum to become entrapped in the saltcake.

Figure 3:
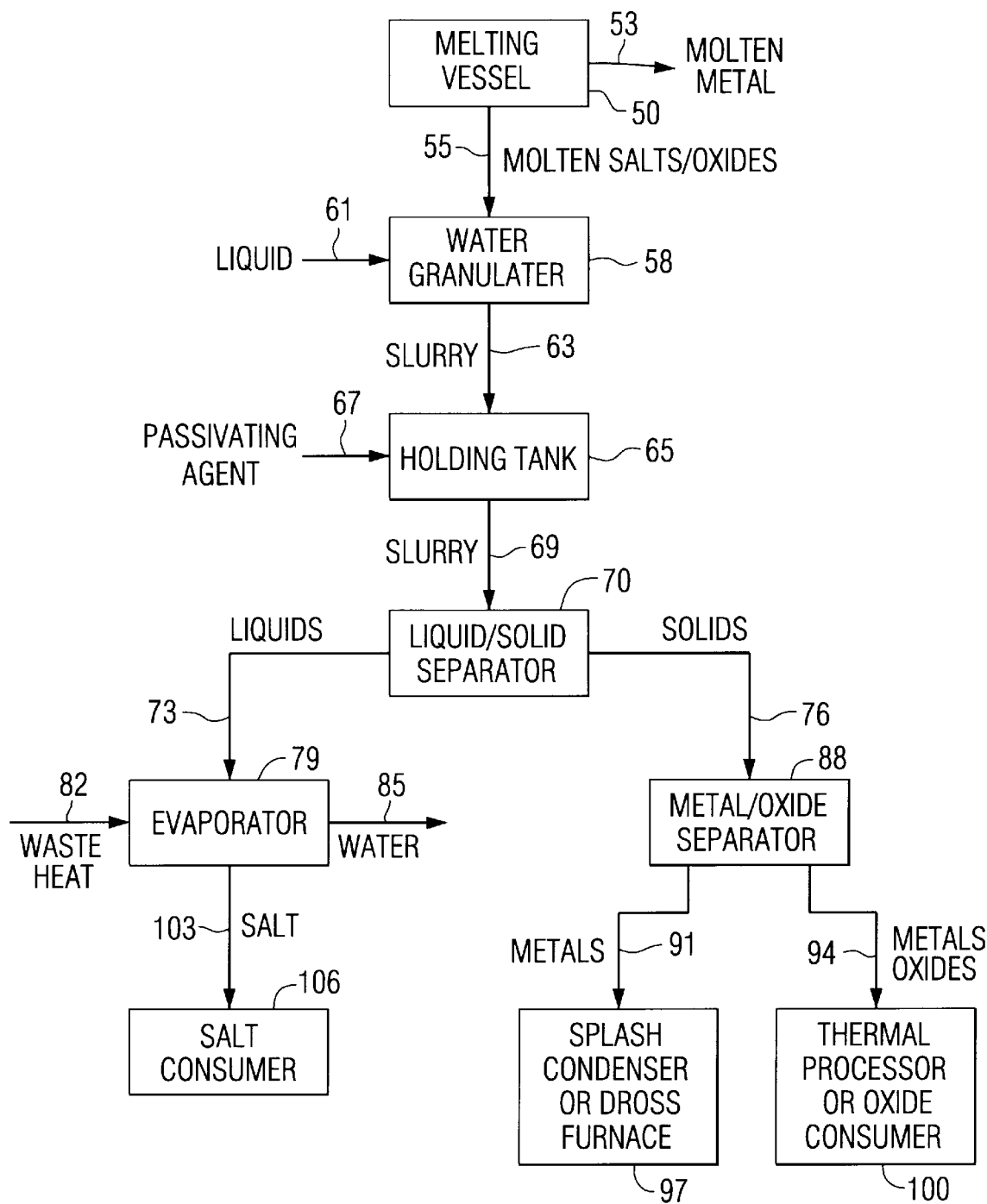
FIG. 3 is a flow chart of a presently preferred method and system of recovering salt, metal and metal oxides from byproduct streams.

FIG. 3 illustrates a present preferred method and system for recycling byproduct mixtures of salts and metal oxides generated by, for example, the zinc splash condenser and the aluminum dross processing furnace heretofore described. The mixtures may also contain small amounts of entrapped metal particles.

In the first step, the molten mixture 55 of salt and metal oxide is tapped from a melting vessel 50, which may be the zinc splash condenser or the aluminum dross processing furnace, and introduced into a water granulator 58. The granulator 58 employs a water granulation process wherein a flow of the molten mixture 55 is introduced into a flow of copious quantities of water 61. Upon contact with the water the molten salt quickly dissolves, forming a brine solution, and the metal and metal oxides immediately fragment into small particles. Typically, the metal and metal oxides fragment into finely divided particles of less than 20-mesh size in diameter. Preferably a minimum flow-rate ratio of ten pounds of water 61 to one pound of molten mixture 55 is maintained in the water granulation process to facilitate the fragmentation of the metal and metal oxides into fine particles. From the water granulator 58, the slurry 63 flows into a holding tank 65. In the aluminum process, it is generally necessary that the holding tank 65 contain a passivating agent (antioxidant) such as the halogen salts of calcium, magnesium, zinc, nickel and cobalt. The passivating agent is provided to immediately coat the fine aluminum particles, making them hydrophobic, thereby stopping the oxidation reaction. In the zinc recovery process, a passivating agent is not required since zinc metal does not oxidize rapidly in the presence of water.

In accordance with the present preferred method and system, as the molten mixture 55 is generated it can be periodically tapped into the water granulator 55 from the melting vessel 50, which can be, for example, a zinc splash condenser 10 or aluminum dross processing furnace 30. Thus, it is possible to completely eliminate the large, difficult to handle solidified chunks of byproducts, aluminum saltcake for example, which remain after all of the molten metal 53 has been tapped from the melting vessel 50. Consequently, as the molten mixture 55 is being produced it can be economically and efficiently reduced to a slurry 67 of brine and small particles of metals and metal oxides. Importantly, this is accomplished without the need for large, capital-intensive crushing and milling equipment as is the common, state-of-the-art practice. The slurry 67 can then be easily and economically processed to completely recover all constituents by employing the subsequent steps of the presently preferred method.

Additionally, depending upon specific process practices that generate the molten mixture 55 of salt and metal oxides, particularly as practiced by dry salt bath aluminum dross processors, it may be necessary to precondition the molten mixture of salt and metal oxide to ensure a liquid, uniform flow of material to the water granulator 58. This preconditioning step for the molten mixture 55 can be accomplished in a rotary furnace where additional salt and heat are added to the molten mixture 55 to obtain the desired free-flowing, uniform liquid material.

According to the presently preferred method and system, the slurry 67 is then passed through a liquid-solid separator 70 which can employ a series of liquid-solid separation devices which are well known in the art. For example, the liquid-solid separator 70 can include a series of cyclones, centrifuges, thickeners and filters to carryout an effective first liquid-solid separation. Additionally, a flocculent, for example, polyelectrolytes or hydrolyzing salts (such as aluminum sulfates) can be added in the thickener to increase the settling rate of the solids. The liquid-solid separator 70 produces a clear brine 73 and solids 76 suitable for further processing or economic sale. The pH of the slurry can be monitored throughout the solid-liquid separation process and can be adjusted as necessary to preferably maintain the pH at about 8.3 which helps to ensure the removal as a solid 76 of all dissolved metals from the brine 73. Although a pH of about 8.3 is preferred, keeping the pH within a range of from about 8.1 to about 8.6 is acceptable.

Figure 4:
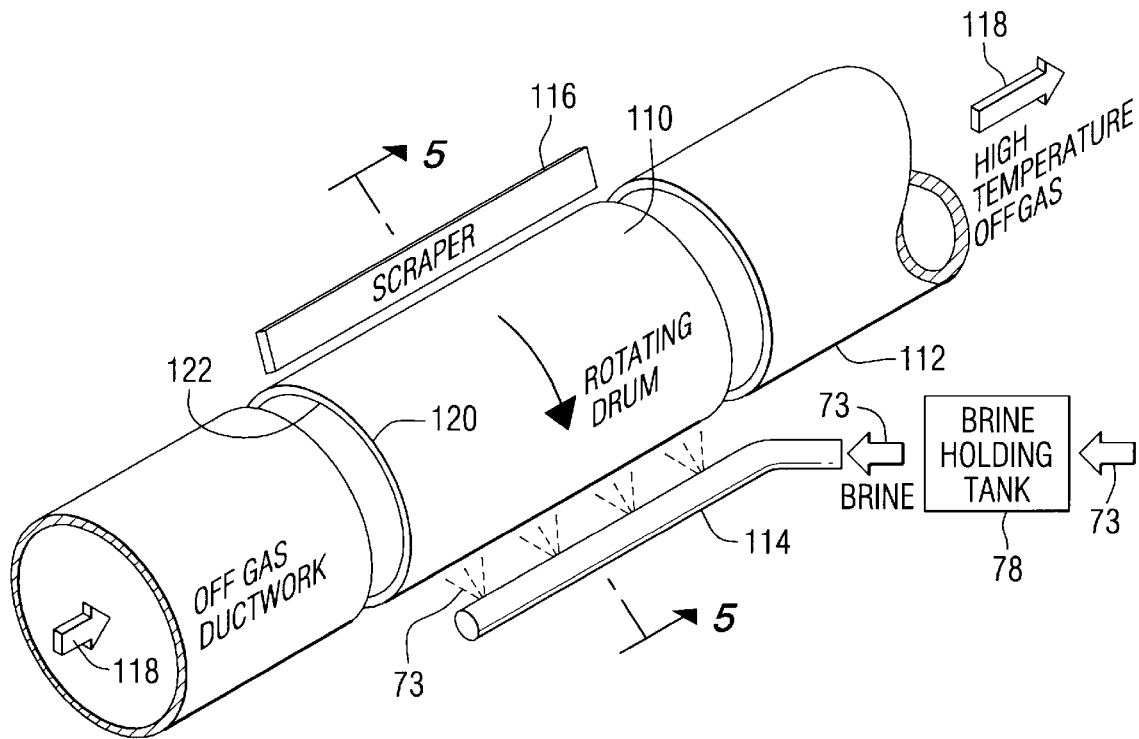
FIG. 4 is a schematic flow chart illustrating a present preferred rotating drum salt brine evaporator.
Figure 5:
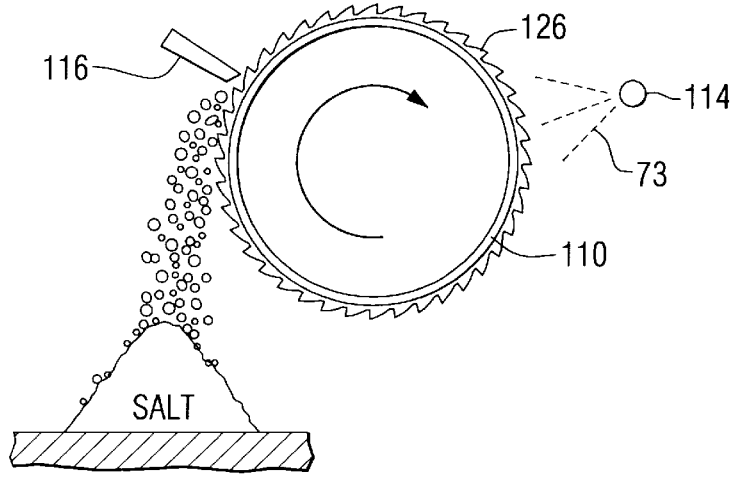
FIG. 5 is a view of FIG. 4 taken along the line V—V.

The clear brine 73 can then be pumped to an evaporator 79, as shown in FIGS. 4 and 5. Alternatively, the brine 73 can be pumped into a brine holding tank 78 where it can be held until being sent to the evaporator 79. The evaporator 79 can preferably be a rotating cylindrical drum 110 that is part of the circumference of a high temperature offgas ductwork 112 from an adjacent high temperature material processing furnace operation as commonly employed in the steel and aluminum industries. The exterior surface 120 of the drum can be constructed of mild steel, or, for complete resistance against corrosion, can be wrapped with an aluminum bronze or other similar alloy.

The interior surface 122 of the rotating drum 110 is heated to a very high temperature by the hot furnace offgas 118 passing through the ductwork 112. As the brine 73 flows from the liquid/solid separator 70, or from the brine holding tank 78, the brine 73 is sprayed from a spray bar 114 onto the hot exterior surface 120 of the rotating drum 110. The spray bar 114 can simply be, for example, a pipe with a sealed end and a series of apertures, or nozzles (not shown), along the length thereof which release the brine 73 onto the rotating drum 110 as the brine 73 is pumped from the brine holding tank 78. At the high temperature of the exterior surface 120 of the drum 110, the water contained in the brine 73 instantaneously evaporates, depositing a thin layer of salt 126 on the surface of the drum 110. Consequently, waste heat from the steel and aluminum industry can be economically utilized to evaporate the water from the brine solution to recover a salable salt product.

As the drum 110 rotates, the salt layer 126 builds up and is periodically removed by a scraper 116, or doctor blade. The salt can then be conveyed from the area to bulk storage or packaging. This method of removing the salt 126 from the drum 110 produces a flake product. If desired, further processing equipment can be installed to produce salt pellets and/or briquettes.

The metal and metal oxide solids 76 recovered from the liquid-solid separator 70 are subsequently transferred to a metal/oxide separator 88 where any number of techniques, such as air separation/classification and screening, which are well known in the art can be employed to separate the metal from the metal oxides. For final recovery, the separated zinc or aluminum metal is charged, for example, to the zinc splash condenser 10 or the aluminum dross processing furnace 30. The separated metal oxides 94 can be recycled in different ways. For example, the zinc oxides are returned to the zinc thermal processing operation where they are reduced to a metal vapor for reintroduction to the zinc splash condenser 10 for final recovery as zinc metal. On the other hand, the aluminum oxides can be further processed, for example, multiple-washed, for the complete removal of chlorides to produce a salable product. Various chlorides washing schemes that are well known in the art can be employed to accomplish this goal.

Consequently, in accordance with the present preferred method and system, all byproducts are economically processed and no materials are landfilled. Furthermore, because the water granulation process effectively reduces the molten mixture into a slurry of brine and small particles of metals and metal oxides, the need for large capital-intensive equipment to grind the saltcake into small particles is eliminated. Since large capital-intensive equipment is no longer required for this important initial size reduction step, relatively small volumes of material, as typically generated by the zinc splash condenser or aluminum dross processing operations, can be economically processed at the site of generation. All of the products recovered are reusable and salable. Moreover, purchased energy is minimal because the method can use waste heat from existing metal processing operations to evaporate the water from the brine solution to recover a salable salt product.

Although certain embodiments of the invention have been described in detail, it will be appreciated by those skilled in the art that various modification to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A method of recycling byproduct streams containing metals, metal oxides and salts, the method comprising:
    a. introducing a flow of a molten mixture of said metals, metal oxides and salts into a flow of water at a flow rate to dissolve the molten salts into the water forming a brine solution and fragment the metals and metal oxides into small particles, the molten mixture and water thus forming a slurry of brine, metal and metal oxides;
    b. separating the brine solution from the small particles of metals and metal oxides;
    c. separating the metal from the metal oxides, the metals thereafter may be returned to a melting furnace and the metal oxides may be one of further processed for sale and converted for re-use in a thermal process, whereby the metals and metal oxides are completely recycled; and
    d. separating the salts from the brine solution, whereby the salts are completely recycled.

2. The method of claim 1 wherein the flow rate is provided at a flow rate ratio of ten pounds of water to one pound of molten mixture.

3. The method of claim 1 further comprising preconditioning the molten mixture to ensure a uniform liquid flow of molten material to introduce into the flow of water.

4. The method of claim 3 wherein said preconditioning comprises introducing additional heat and salt to the molten mixture to obtain a free-flowing, uniform liquid material.

5. The method of claim 1 further comprising flowing said slurry into a holding tank immediately after the molten mixture is introduced into the water.

6. The method of claim 5 further comprising providing a passivating agent in said holding tank to prevent the oxidation of metal particles in the slurry which may be susceptible to such oxidation.

7. The method of claim 6 wherein said passivating agent is a halogen salt selected from the group consisting of calcium, magnesium, zinc, nickel and cobalt.

8. The method of claim 1 wherein separating the brine solution from the metals and metal oxides comprises an initial liquid/solid separation step utilizing one of a cyclone and a centrifuge.

9. The method of claim 8 further comprising a second liquid/solid separation step utilizing a thickener.

10. The method of claim 1 wherein said separating the metals from the metal oxides comprises at least one of air separation/classification and screening.

11. The method of claim 1 wherein said separating the salts from the brine solution comprises evaporating the brine solution to recover the salts.

12. A method of recycling byproduct streams containing metals, metal oxides and salts, the method comprising:
    a. introducing a flow of a molten mixture of said metals, metal oxides and salts into a flow of water such that the molten salts dissolve into the water forming a brine solution and the metals and metal oxides fragment into small particles, the molten mixture and water thus forming a slurry of brine, metal and metal oxides;
    b. separating the brine solution from the small particles of metals and metal oxides;
    c. separating the metal from the metal oxides the metals thereafter may be returned to a melting furnace and the metal oxides may be one of further processed for sale and converted for re-use in a thermal process, whereby the metals and metal oxides are completely recycled;
    d. separating the salts from the brine solution, whereby the salts are completely recycled;
    e. wherein said separating the brine solution from the metals and metal oxides comprises an initial liquid/solid separation step utilizing one of a cyclone and a centrifuge;
    f. wherein said separating the brine solution from the metals and metal oxides comprises a second liquid/solid separation step utilizing a thickener; and
    g. introducing a flocculent into the thickener to increase the settling rate of the solids.

13. The method of claim 12 wherein said flocculent comprises at least one of polyelectrolytes and hydrolyzing salts.

14. The method of claim 13 wherein said hydrolyzing salts are aluminum sulfates.

15. The method of claim 12 further comprising a third liquid/solid separation step utilizing a sand filter to ensure a complete removal of all solids from the brine solution.

16. The method of claim 15 further comprising maintaining the slurry at a pH in the range of 8.1 to 8.6 to aid in the removal as a solid of all dissolved metals.

17. A method of recycling byproduct streams containing metals, metal oxides and salts, the method comprising:
    a. introducing a flow of a molten mixture of said metals, metal oxides and salts into a flow of water such that the molten salts dissolve into the water forming a brine solution and the metals and metal oxides fragment into small particles, the molten mixture and water thus forming a slurry of brine, metal and metal oxides;

b. separating the brine solution from the small particles of metals and metal oxides;

c. separating the metal from the metal oxides, the metals thereafter may be returned to a melting furnace and the metal oxides may be one of further processed for sale and converted for re-use in a thermal process, whereby the metals and metal oxides are completely recycled;

d. separating the salts from the brine solution, whereby the salts are completely recycled;

e. wherein said separating the salts from the brine solution comprises evaporating the brine solution to recover the salts; and f. wherein evaporating the brine solution comprises spraying the brine solution onto an exterior surface of a rotating heated cylindrical drum, the water in the brine solution evaporating instantly upon contact with the drum and depositing a thin layer of salt thereon as the drum rotates.

18. The method of claim 17 wherein the drum is heated using waste heat from an offgas ductwork of an existing material processing furnace.

19. The method of claim 17 further comprising periodically removing the salt from the surface of the drum.

20. The method of claim 19 wherein said periodically removing comprises scraping the salt from the surface of the drum using one of a scraper and a doctor blade and transporting the salt therefrom for sale or further processing.

* * * * *